Patented Oct. 9, 1934

1,976,573

UNITED STATES PATENT OFFICE 1,976,573

AGGREGATE

Walter Ray Macdonald, Los Angeles, Calif., assignor of one-half to William M. Sutherland, Pasadena, Calif., and one-half to Neil W. Snow, Altadena, Calif.

No Drawing. Application August 5, 1933, Serial No. 683,906

2 Claims. (Cl. 106—24)

This invention relates to a product which has utility as an aggregate for concrete. It appertains to a siliceous material which comprises homogeneous bodies having pores and cells and is of light weight compared with aggregate now used. It provides a hard, light weight body which firmly bonds with cement to produce a concrete of light weight, good heat insulating qualities, good sound insulating characteristics having high compressive, and tensile qualities and not subject to disintegration by fire. The primary object of this invention is to provide an article of the character described and a process of making the same.

Those objects are accomplished by means of utilization of the process and resultant product hereinafter described. Inert diatomite is cellular so that it has high absorbent qualities and will imbibe large quantities of oil, and also has high heat insulating properties. Diatomite is found in its natural state in cementitious masses. Attempts have been made to fuse lumps of diatomite without substantially decreasing the volumetric size of the lumps, but due to its heat insulation qualities, the heat of fusion, unless extremely high temperatures are employed, does not penetrate the masses and as a result forms a fused envelope so that hard homogeneous masses are not produced. Attempts to fuse diatomite by application of external heat have failed because unless extremely high temperatures are employed, only the outer surfaces are fused with an inner stratum of sintered material and an unchanged core.

It is an object of this invention to produce fused homogeneous masses of diatomite having porosity. To this end, lumps of inert diatomite are impregnated with an oil serving as a fuel. Hydrocarbon oils are preferable and distillate, slops or refuse may be used. The diatoms are cellular and oil penetrates into and between the cells of the lumps, resulting in a combustible mixture of oil and air permeating the cells and the interstices between particles. It is preferable to saturate the diatomaceous material with oil. The following specific steps are found to be preferable: Diatomite or diatomaceous shale is first broken into lumps of a substantial size, for illustration from four inches to four mesh, and then either sprayed with oil or submerged in an oil bath until oil has penetrated beyond the surface of each lump. Any amount of oil from four gallons to forty gallons per cubic yard of diatomite may be used. The oil saturated mass may then be burned by any suitable method which will cause the internal burning of the combustible mixture of oil and air. This may be done in an oven, a retort, a rotary kiln, or gas producer if desired. The saturated mass is itself set afire. Heat is internally produced sufficient to cause complete fusion throughout the diatomaceous lumps. While I have not determined the exact nature of the action of the burning oil on the diatomite, one effect is that the fusion point is attained at a lower temperature. The gases generated by combustion insure the maintenance of cells and pores, so that when the mass cools hard porous siliceous lumps remain, which are comparatively light in weight. A physical change is thus produced. The lumps may be further broken up to sizes suitable for the particular use for which they are to be employed. Carbon released may act as a flux but I do not wish to confine myself to any theory.

When used as an aggregate for concrete, the pores permit intrusion of the cement. The cement sets forming mechanical locks with the aggregate thereby increasing the strength. The resultant concrete due to the hardness of the aggregate, its light weight and the bonds formed with the cement produces a strong light weight concrete. Due to the cellular structure of the aggregate, the concrete has high heat and sound insulating qualities. Furthermore, the aggregate does not confine water and is fireproof as, under the action of heat, there is no confined steam formed which might burst the aggregate as in ordinary concrete. Although the product is especially suited for an aggregate yet it has advantages as a filler. Other uses will be apparent to those skilled in the art.

What I claim is:—

1. A process of preparing a diatomaceous earth product comprising permeating lumps of inert diatomite with combustible oil and causing combustion of said oil.

2. A process of preparing a diatomaceous earth product comprising introducing combustible oil into lumps of inert diatomaceous earth and directly burning said oil within said lumps.

WALTER RAY MACDONALD.